(12) United States Patent
Mouri et al.

(10) Patent No.: US 8,251,376 B2
(45) Date of Patent: *Aug. 28, 2012

(54) BICYCLE SUSPENSION HAVING STROKE AND DAMPER ADJUSTMENT

(75) Inventors: Seiji Mouri, Ikoma (JP); Tsuyoshi Miyake, Osaka (JP)

(73) Assignee: Shimano Inc., Sakai (JP)

( * ) Notice: Subject to any disclaimer, the term of this patent is extended or adjusted under 35 U.S.C. 154(b) by 503 days.

This patent is subject to a terminal disclaimer.

(21) Appl. No.: 12/504,668

(22) Filed: Jul. 17, 2009

(65) Prior Publication Data

US 2011/0012317 A1 Jan. 20, 2011

(51) Int. Cl.
  *B60G 17/00* (2006.01)
(52) U.S. Cl. ............... 280/5.515; 701/37; 188/288
(58) Field of Classification Search ......... 280/5.515, 280/5.519; 701/37, 38; 188/24.22, 266, 188/288
  See application file for complete search history.

(56) References Cited

U.S. PATENT DOCUMENTS 6,105,988 A * 8/2000 Turner et al. ............. 280/276
6,767,024 B1   7/2004 Kuo
2003/0001358 A1   1/2003 Becker et al.
2005/0103149 A1   5/2005 Hunt et al.
2005/0252330 A1 * 11/2005 Denk ..................... 74/502.2
2006/0064223 A1 *  3/2006 Voss ........................ 701/52
2009/0255768 A1 * 10/2009 Inoue ..................... 188/313

FOREIGN PATENT DOCUMENTS

DE   60120103 T2   11/2007
EP   1992556         11/2008
EP   2269903         1/2011

OTHER PUBLICATIONS

German Office Action for corresponding German Application No. 10 2010 036 443.6, Aug. 19, 2011.

* cited by examiner

*Primary Examiner* — Joseph Rocca
*Assistant Examiner* — Timothy Wilhelm
(74) *Attorney, Agent, or Firm* — Ditthavong Mori & Steiner, P.C.

(57) ABSTRACT

A bicycle suspension includes a stroke adjustment unit, a suspension damper, a damper adjustment unit, and an electronic controller. The stroke adjustment unit is configured to adjust a stroke of the bicycle suspension, which is configured to expand and contract within the stroke. The suspension damper is configured to apply damping force to the bicycle suspension. The damper adjustment unit is configured to adjust the damping force applied by the suspension damper. The electronic controller is configured to control the stroke adjustment unit and the damper adjustment unit.

9 Claims, 11 Drawing Sheets

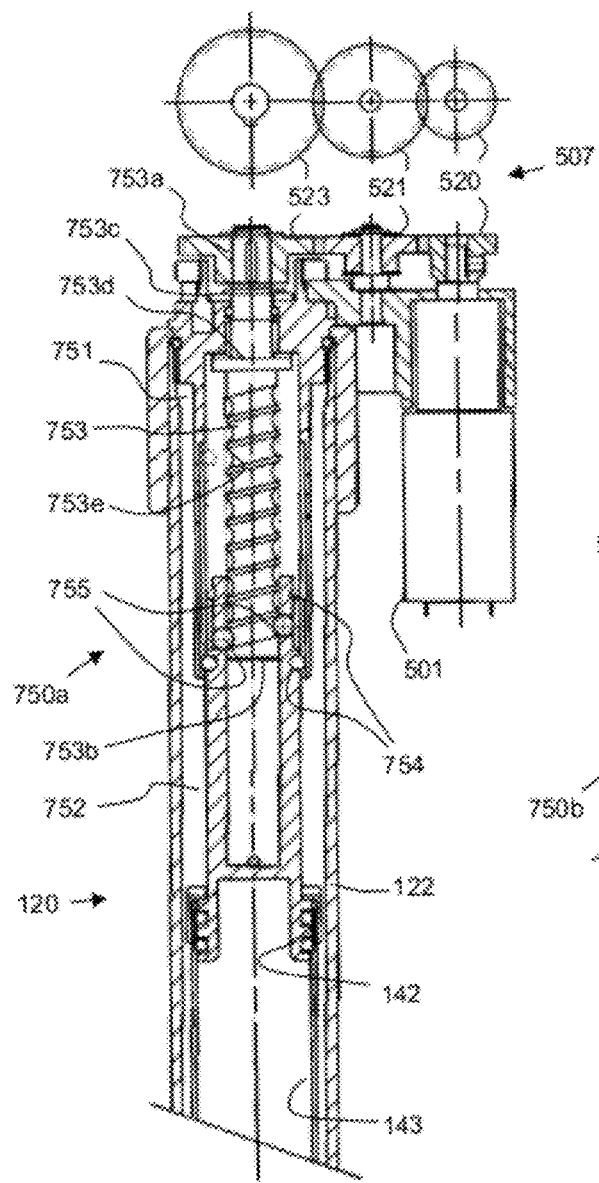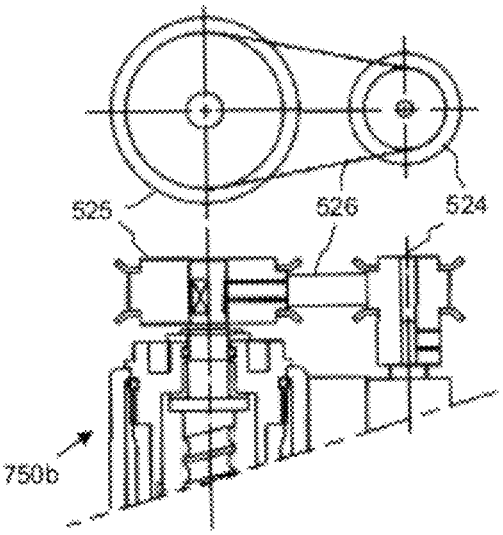
FIG. 6B
FIG. 6D
FIG. 6C
FIG. 6A

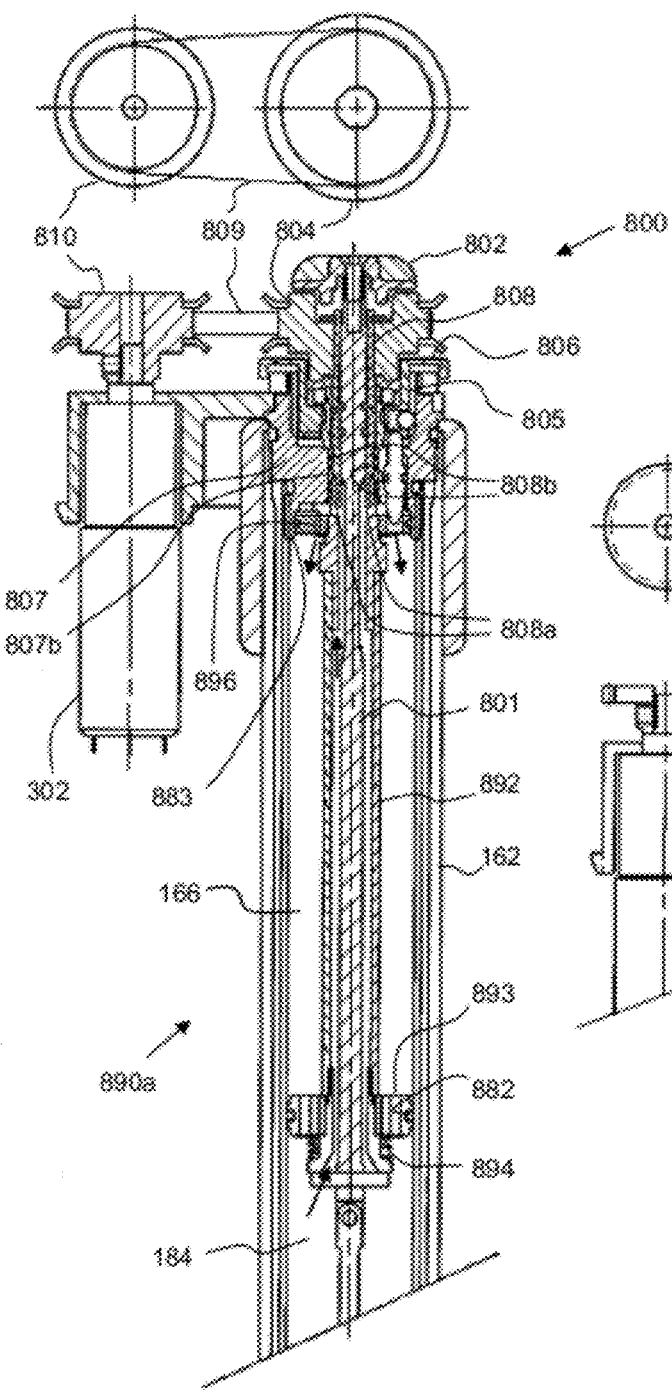
FIG. 8B
FIG. 8A
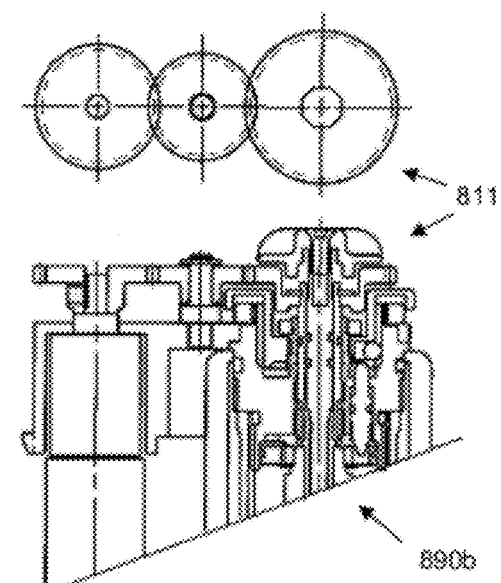
FIG. 8D
FIG. 8C

BICYCLE SUSPENSION HAVING STROKE AND DAMPER ADJUSTMENT

BACKGROUND OF THE INVENTION

1. Field of the Invention

The present invention relates to a suspension for a bicycle.

2. Discussion of the Background

Bicycling is becoming an increasingly more popular form of recreation as well as a means of transportation. Moreover, bicycling has become a very popular competitive sport for both amateurs and professionals. The bicycle industry is constantly improving the various components of the bicycle. In the past, most bicycles had rigid frames that were not provided with front or rear suspension. Thus, such rigid frames typically transmitted shocks resulting from rough riding surfaces directly to a rider.

More recently, bicycles, especially mountain bikes (MTB) and all terrain bikes (ATB), have been outfitted with front and/or rear suspension assemblies to absorb the shocks transmitted to the rider when riding on a rough road. In bicycles with suspensions, it is sometimes desirable to be able to quickly adjust or lockout the suspension as needed and/or desired. Thus, there have been proposals to provide a suspension actuating device on the handlebar of the bicycle so that the rider can adjust or lockout the suspension as needed and or desired while riding, as can be seen from a review of U.S. Pat. No. 6,767,024, U.S. Patent Publication No. 2005/0103149, and U.S. Patent Publication No. 2005/0252330.

It is desirable to continue to improve upon the structure and function of such bicycle components.

SUMMARY OF THE INVENTION

An aspect of the present invention advantageously provides a bicycle suspension including a stroke adjustment unit, a suspension damper, a damper adjustment unit, and an electronic controller. The stroke adjustment unit is configured to adjust a stroke of the bicycle suspension, which is configured to expand and contract within the stroke. The suspension damper is configured to apply damping force to the bicycle suspension. The damper adjustment unit is configured to adjust the damping force applied by the suspension damper. The electronic controller is configured to control the stroke adjustment unit and the damper adjustment unit.

A further aspect of the invention advantageously provides a method of adjusting a bicycle suspension. The method for controlling a bicycle suspension includes providing a stroke adjustment unit to adjust a stroke of the bicycle suspension, which is configured to expand and contract within the stroke and providing a damper adjustment unit which is configured to adjust a damping force applied by a suspension damper to the bicycle. The stroke adjustment unit is electronically controlled to adjust the stroke, and the damper adjustment unit is electronically controlled to adjust the damping force.

These and other features, aspects, and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 4A shows a shock absorber unit in which a damper adjustment unit is provided, and where FIG. 4B shows a shock absorber unit in which a stroke adjustment unit is provided, in accordance with an exemplary embodiment;

FIG. 5A shows the stroke adjustment unit in a long stroke position and configured to move toward a short stroke position, and where FIG. 5B shows the stroke adjustment unit in a short stroke position and configured to move toward the long stroke position, in accordance with an exemplary embodiment;

FIG. 6A is an enlarged, partial front cross-sectional view of another embodiment of a stroke adjustment unit of a shock absorber unit, FIG. 6B is a top schematic view of a transmission unit of the stroke adjustment unit of FIG. 6A, FIG. 6C is an enlarged, partial front cross-sectional view of a further embodiment of a stroke adjustment unit of a shock absorber unit, and FIG. 6D is a top schematic view of a transmission unit of the stroke adjustment unit of FIG. 6C;

FIG. 7A shows the damper adjustment unit in an unlock position, and where FIG. 7B shows the damper adjustment unit in a lockout position, in accordance with an exemplary embodiment;

FIG. 8A is an enlarged, partial front cross-sectional views of another embodiment of a damper adjustment unit of a shock absorber unit, FIG. 8B is a top schematic view of a transmission unit of the damper adjustment unit of FIG. 8A, FIG. 8C is an enlarged, partial front cross-sectional view of a further embodiment of a damper adjustment unit of a shock absorber unit, and FIG. 8D is a top schematic view of a transmission unit of the damper adjustment unit of FIG. 8C;

DETAILED DESCRIPTION OF EMBODIMENTS OF THE INVENTION

Figure 1:
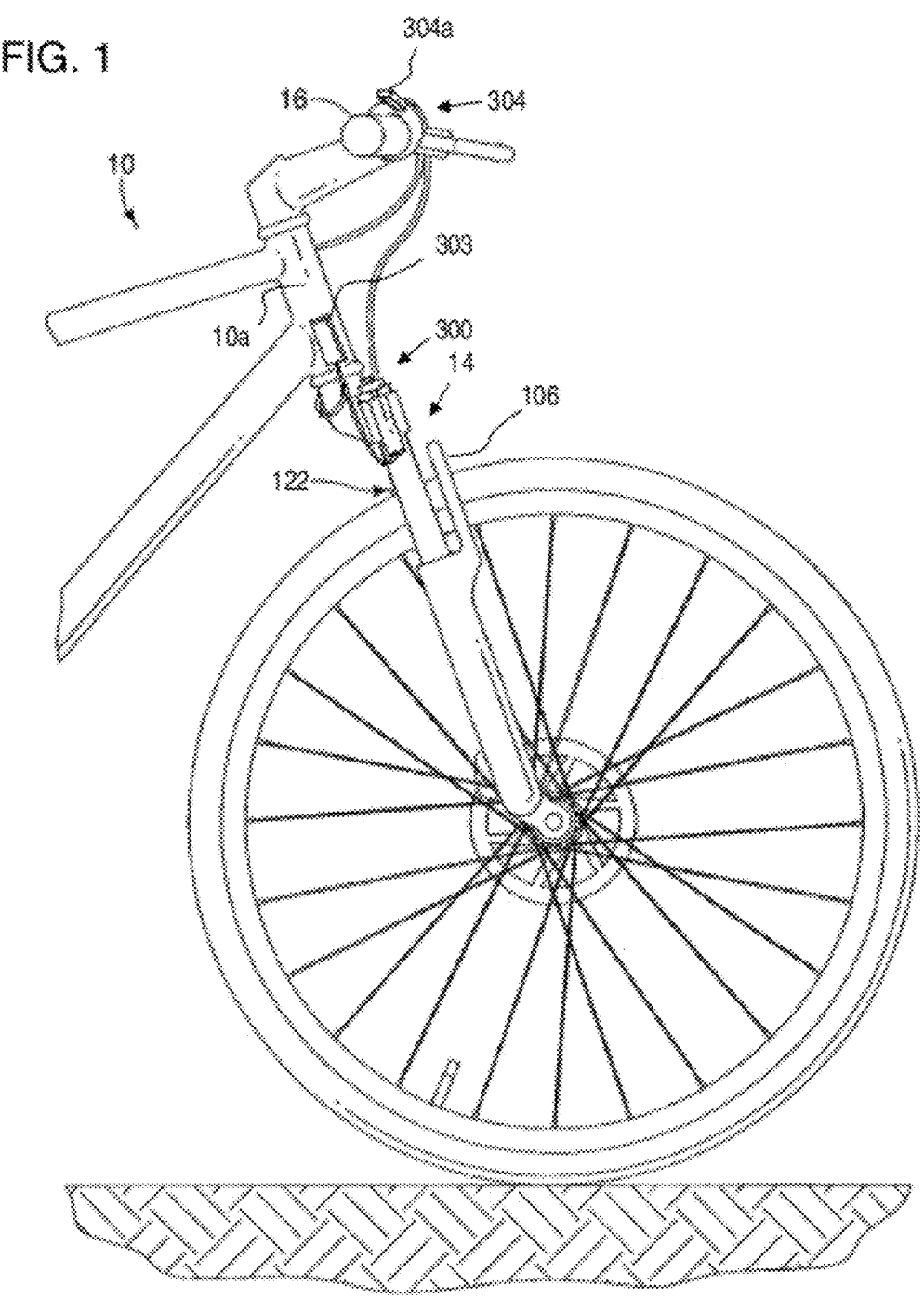
FIG. 1 is a partial side elevational view of a front portion of a bicycle with a front suspension in accordance with an exemplary embodiment.

Embodiments of the present invention will be described hereinafter with reference to the accompanying drawings. In the following description, the constituent elements having substantially the same function and arrangement are denoted by the same reference numerals, and repetitive descriptions will be made only when necessary. It will be apparent to those skilled in the art from this disclosure that the following descriptions of the embodiments of the present invention are provided for illustration only and not for the purpose of limiting the invention as defined by the appended claims and their equivalents.

Figure 2:
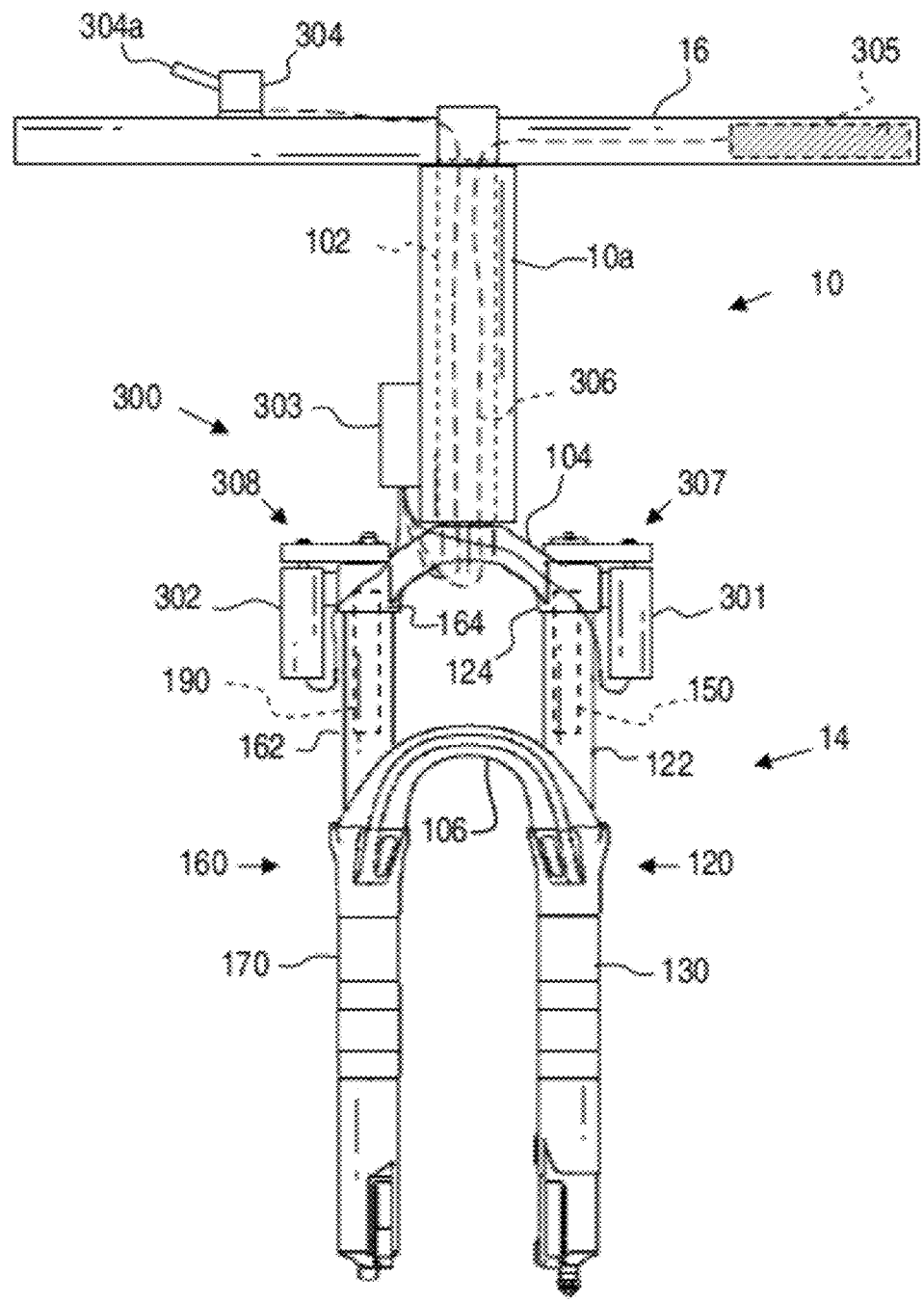
FIG. 2 is a front elevational view of the front suspension and an electronic control system thereof, in accordance with an exemplary embodiment.

Referring initially to FIGS. 1 and 2, a bicycle 10 is illustrated that is equipped with an electronic control system 300 for selectively controlling a front suspension 14 in accordance with an embodiment of the present invention. The electronic control system 300 is provided to electronically control the front suspension 14 for selectively switching between a first state (e.g., a long-to-short stroke setting position) and a second state (e.g., a short-to-long stroke setting position).

As seen in FIGS. 1 and 2, the front suspension 14 has a first shock absorber unit 120 that includes a first upper telescopic tube 122 slidably received within a first lower telescopic tube 130, and a second shock absorber unit 160 that includes a second upper telescopic tube 162 slidably received within a second lower telescopic tube 170. The first and second shock absorber units 120 and 160 are configured to absorb and dampen shocks while riding the bicycle 10 over rough terrain. The upper telescopic tube 122 is provided with a first electric motor unit 301 and a first transmission unit 307 for selectively adjusting the stroke length of the front suspension 14. The upper telescopic tube 162 is provided with a second electric motor unit 302 and a second transmission unit 308 for selectively locking or unlocking the damper function of the front suspension 14. A switch unit 304 is provided on a handlebar 16 of the bicycle 10 and has an adjustment lever 304a that can be moved between at least two positions (e.g., a first state corresponding to the long-to-short stroke position, and a second state corresponding to the short-to-long stroke position), which in turn actuates the first and second electric motor units 301 and 302 for switching to either of the states. In the illustrated embodiment, the adjustment lever 304a is moved between upward and downward positions. It should be noted, however, that other configurations including a knob that can be rotated or a push button to switch positions may be utilized, as will be readily apparent to those of ordinary skill in the art based upon the disclosure set forth herein.

As seen in FIGS. 1 and 2, the front suspension 14 is incorporated into a front fork of the bicycle. (It should be noted that the suspension of the present invention can alternatively or additionally be used as a rear suspension for the bicycle with an actuating unit provided for each suspension.) The front fork includes a center tube 102 that is pivotally connected to a head tube 10a of the frame of the bicycle and a bracket (or first connector) 104 that rigidly connects the center tube 102 to the first shock absorber unit 120 and the second shock absorber unit 160. The first and second shock absorber units 120 and 160 are attached at the lower ends thereof to either ends of an axle of the front wheel of the bicycle. The handlebar 16 is rigidly connected at a halfway position thereof to an upper end of the center tube 102. A structural member or bracket (or second connector) 106 is provided that rigidly connects a lower telescopic tube 130 of the first shock absorber unit 120 to a lower telescopic tube 170 of the second shock absorber unit 160 in order to provide structural stability to the front suspension 14. The head tube 10a of the bicycle frame steerably receives the center tube 102 of the upper telescoping members 122 and 162 (which are interconnected via bracket 104), and the front wheel is attached to lower telescopic tubes 130 and 170 (which are interconnected via bracket 106) of the first and second shock absorber units 120 and 160, respectively. Thus, the front suspension 14 is provided in between the bicycle frame and the front wheel to allow shock received by the front wheel to be absorbed and dampened before it reaches the frame.

The first shock absorber 120 includes the first upper telescoping member 122 having an upper end connected to a connecting bracket 124 of the bracket 104. The first upper telescoping member 122 has a lower end that is slidably received within an upper end of the first lower telescopic tube 130 of the first shock absorber unit 120. Similarly, the second shock absorber unit 160 includes the second upper telescoping member 162 having an upper end connected to a connecting bracket 164 of the bracket 104, and the second upper telescoping member 162 has a lower end that is slidably received within an upper end of the second lower telescopic tube 170 of the second shock absorber unit 160. The lower ends of the first and second lower telescopic tubes 130 and 170 are attached to the axle of the front wheel of the bicycle in any known manner.

Basically, the electronic control system 300 includes a control board 303, the switch unit 304, a battery unit 305, the first electric motor unit 301 provided with a stroke adjustment unit 150 accommodated into the first shock absorber unit 120, and the second electric motor unit 302 provided with a damper adjustment unit 190 accommodated into the second shock absorber unit 160. Electrical cords or wires 306 are provided to electronically connect the switch unit 304, the battery 305, each of the first and second electric motors unit 301 and 302, and the control board 303, and preferably arranged through a tube cavity of the handlebar 16 and the center tube 102. The battery 305 is secured within part of the tube cavity positioned at one end of the handlebar 16, to which an end cap thereof (not shown) is provided and configured to be manually detachable such that the battery can be replaced when exhausted or for maintenance through the end of the handlebar 16. The first and second electric motors unit 301 and 302 respectively actuate an stroke adjustment unit and a damper adjustment unit (not shown in FIGS. 1 and 2, but will be described in greater detail in FIGS. 4A-8D) which are provided within the upper telescoping member 122 and the second upper telescoping member 162, respectively.

Figure 3:
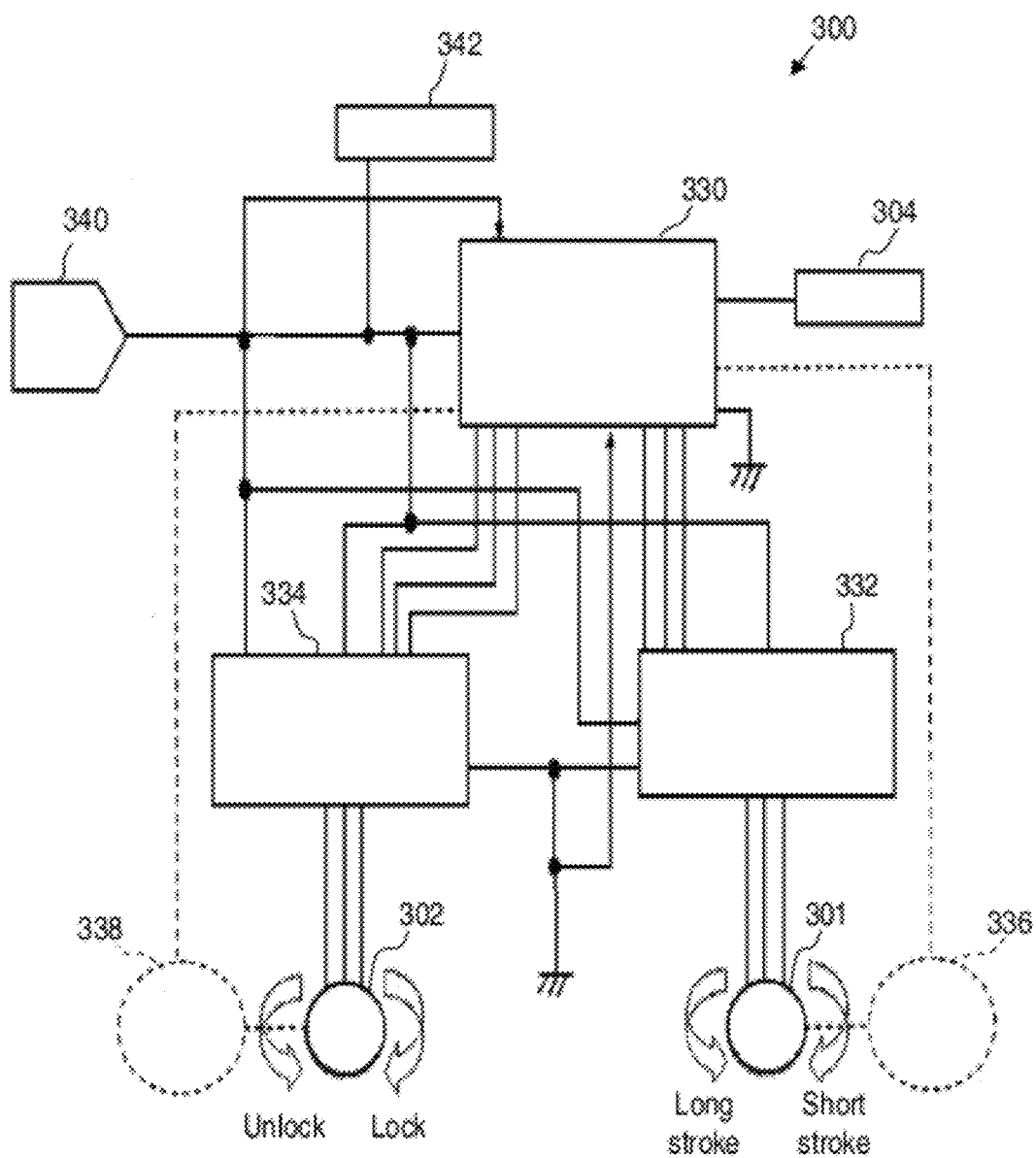
FIG. 3 is a block diagram for the electronic control system of the front suspension, in accordance with an exemplary embodiment.

FIG. 3 will be used for describing general features of the electronic control system, in accordance with an exemplary embodiment. As seen in FIG. 3, the electronic control system 300 includes a microcomputer 330, and first and second motor drivers 332 and 334 each connected to each of the first and second electric motors 301 and 302. The microcomputer 330 is configured to receive a position signal from the switch unit 304 and to receive position signals from first and second position sensors 336 and 338 each detecting each state of the electric first and second motors 301 and 302. A power supply unit 340 is provided for directly or indirectly supplying the power to the microcomputer 330 and each of the electric motors 301 and 302. Preferably, apart from the switch unit 304, an on/off switch 342 is also provided that can be placed at or near the control board 303 in a conventional manner. Based on the signal received from the switch unit 304, the microcomputer 330 runs a computer program that may be stored in the microcomputer 330 or otherwise in other memory devices (not shown) and in turn send a signal to the motor drivers 332 and 334 such that the electric motors are driven in a programmed manner that provides, e.g., on/off control, feedback control, and a combination thereof. In such configuration where a separate motor driver and sensor are provided for each electric motor unit, the microcomputer 330 selectively controls the two electric motors in alternate, consecutive operations thereof.

Figures 4A, 4B:
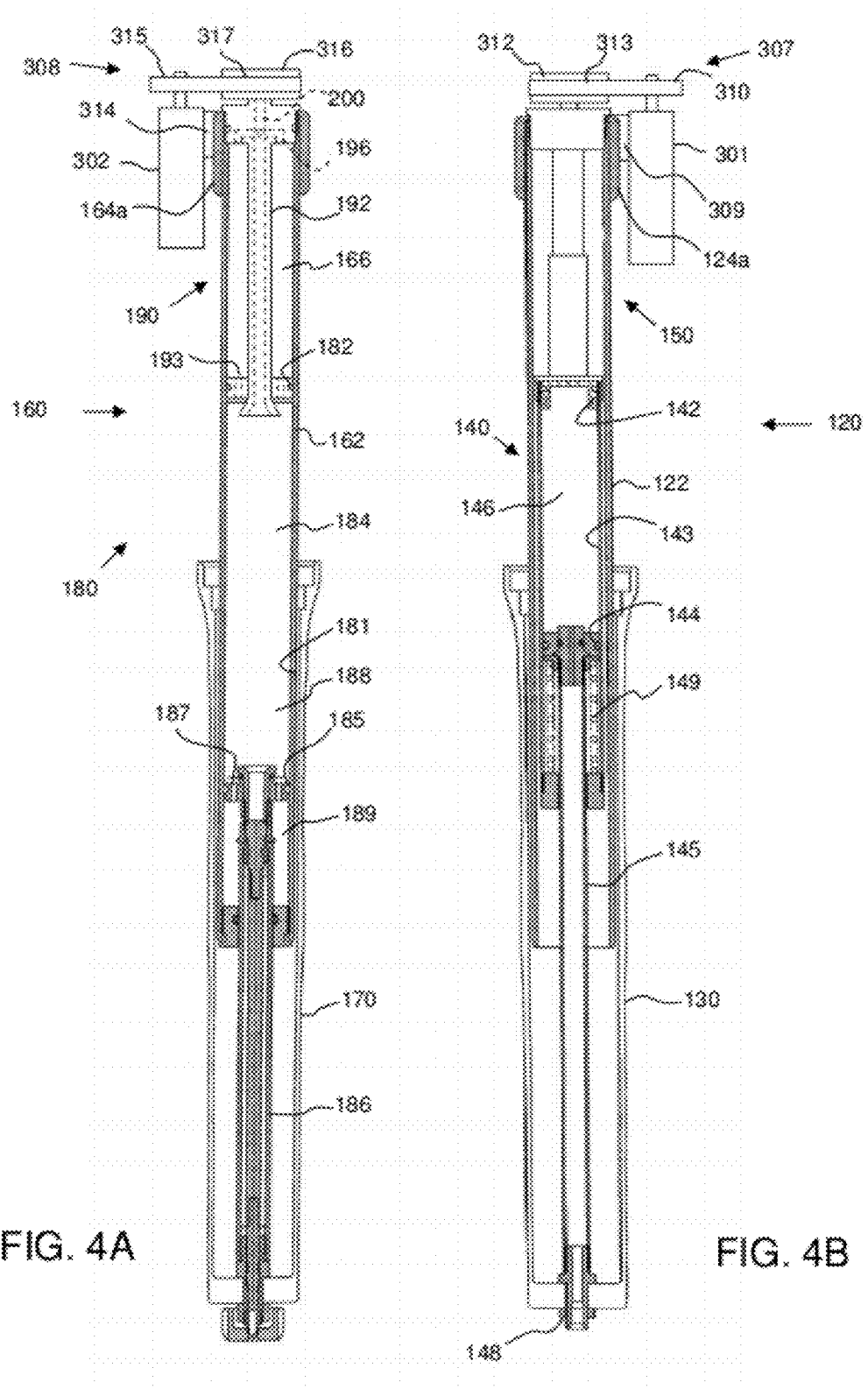
FIGS. 4A and 4B are front cross-sectional views of shock absorber units of the front suspension of FIG. 2, where
Figure 5A:
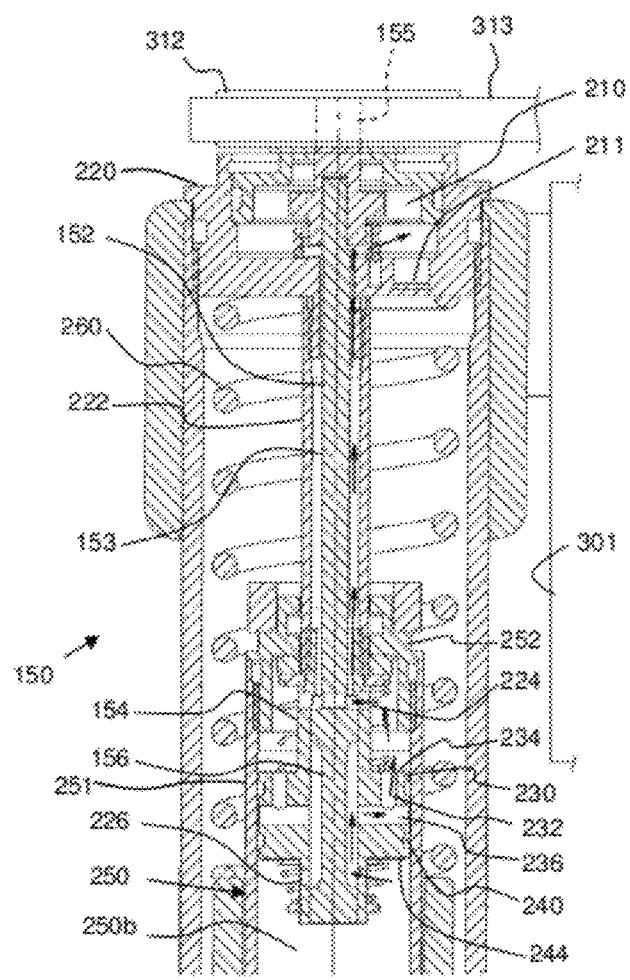
FIGS. 5A and 5B are enlarged, partial front cross-sectional views of the stroke adjustment unit of the shock absorber unit of FIG. 4B, where
Figure 5B:
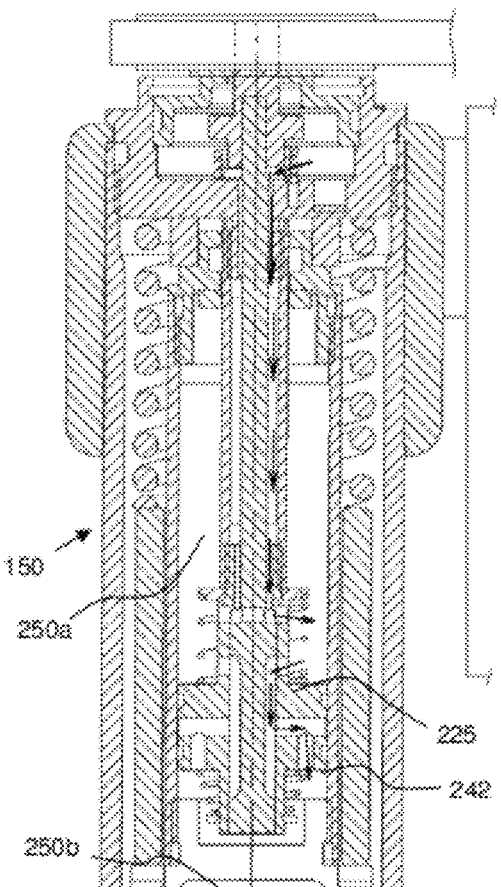
Figure 7A:
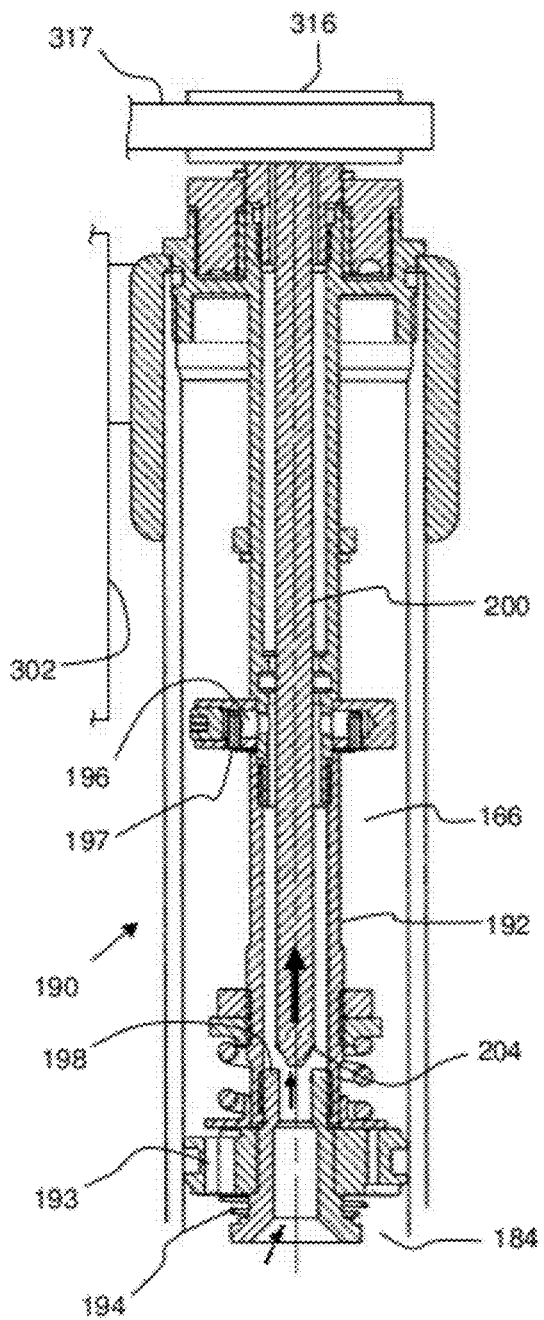
FIGS. 7A and 7B are enlarged, partial front cross-sectional views of the damper adjustment unit of the shock absorber unit of FIG. 4A, where
Figure 7B:
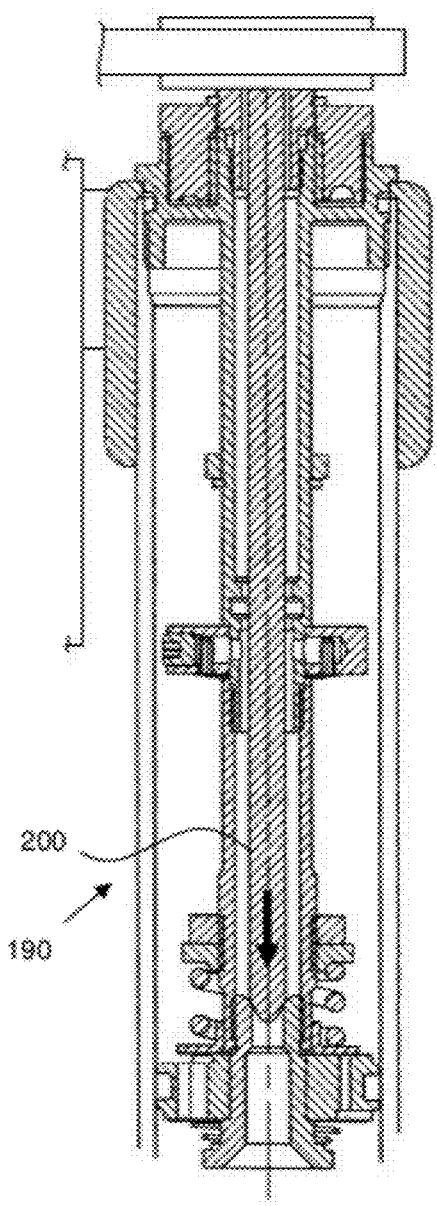

FIGS. 4A and 4B and will be used to describe the general features of the first and second shock absorber units 160 and 120, respectively, of the front suspension 14. The first shock absorber unit 120 incorporates an adjustable air spring 140, and the second shock absorber unit 160 incorporates a dampening unit 180, which in unison (via bracket 106) provide the front suspension 14 with spring characteristics and dampening characteristics. The first shock absorber unit 120 also incorporates a stroke adjustment unit 150 on an upper end of the adjustable air spring 140, and the second shock absorber unit 160 incorporates a damper adjustment unit 190 on an upper end of the dampening unit 180. FIG. 4A depicts the damper adjustment unit 190 in a generic manner in order to simplify the depiction thereof, while FIGS. 7A and 7B depict enlarged, detailed views of the damper adjustment unit 190, and FIGS. 8A and 8B and FIGS. 8C and 8D depict alternate embodiments of the damper adjustment unit and transmission units used therewith. Additionally, FIG. 4B depicts the stroke adjustment unit 150 in a generic manner in order to simplify the depiction thereof, while FIGS. 5A and 5B depict enlarged, detailed views of the stroke adjustment unit 150, and FIGS. 6A and 6B and FIGS. 6C and 6D depict alternate embodiments of the stroke adjustment unit and transmission units used therewith.

Referring now to FIG. 4B, the adjustable air spring 140 includes an upper seal member 142 that is connected to the first upper telescoping member 122 via the stroke adjustment unit 150. The longitudinal position of the upper seal member 142 along the first upper telescoping member 122 can be adjusted by the stroke adjustment unit 150, and this adjustment determines the maximum total stroke length of the first shock absorber unit.

The adjustable air spring 140 further includes a lower seal member 144 that is rigidly connected to the lower end of the lower portion 130 by tube 145. The lower seal member 144 is slidably received within a tube 143 that is connected to the upper seal member 142 (therefore, the lower seal member 144 may also be called a "piston" 144), and an air chamber 146 is thus defined between the upper seal member 142 and the lower seal member 144. The air chamber 146 acts as an air spring between the upper telescoping member 122 (via upper seal member 142) and the lower portion 130 (via lower seal member 144). The amount and pressure of air within the air chamber 146 can be adjusted by the user via valve/nozzle 148, which is fluidly connected to the air chamber 146 via a passage extending through tube 145. The adjustable air spring 140 can also include a coil spring 149, which biases the lower seal member 144 toward the upper seal member 142 and provides further spring/dampening characteristics to the adjustable air spring 140.

As noted above, the stroke adjustment unit 150 can be used to adjust the maximum total stroke length of the first shock absorber unit 120 by adjusting the longitudinal position of the upper seal member 142 along the upper telescoping member 122. Since the amount of air within the air chamber 146 will remain relatively constant during use (absent adjustment using the valve/nozzle 148, of course), the relative positions between the upper seal member 142 and the lower seal member 144 will remain relatively constant when outside forces on the front suspension 14 are disregarded. Thus, the adjustment of the longitudinal position of the upper seal member 142 along the upper telescoping member 122 will have the effect of adjusting the longitudinal position of the lower seal member in the same direction, which will thereby adjust the maximum total stroke length of the first shock absorber unit 120. For example, if the upper seal member 142 is moved upward, then the lower seal member 144 will also move upward relative to the upper telescoping member 122 and the maximum total stroke length of the first shock absorber unit 120 will be reduced. The stroke adjustment is transmitted to the second shock absorber unit 160 via the bracket 104 and the bracket 106.

Referring now to FIGS. 4B, 5A, and 5B, the stroke adjustment unit 150 is provided with the first electric motor unit 301 and the first transmission unit 307 at an upper end of the first shock absorber unit 120. The first electric motor unit 301 is preferably secured by a motor housing or bracket 309 to a sleeve 124a (part of a connecting bracket 124) that rigidly holds a periphery of an upper end of the upper telescopic tube 122. The stroke adjustment unit 150 includes an actuator that can adjust the longitudinal length of the stroke adjustment unit 150 according to a rotational position of the actuator such that the longitudinal position of the upper seal member 142 is adjusted. The transmission unit 307 includes a pulley 310 provided at a drive axis of the first electric motor unit 301, a pulley 312 provided at a driven axis of the actuator of the stroke adjustment unit 150, and a timing belt 313 operatively connecting the two pulleys for providing a torque transmission from the first electric motor unit 301 to the stroke adjustment unit 150 with a precise controlled timing.

Referring now to FIG. 4A, the dampening unit 180 includes an upper seal member 182 that is rigidly connected to the second upper telescoping member 162. The dampening unit 180 further includes a lower seal member 185 that is rigidly connected to the lower end of the second lower telescopic tube 170 by a tube 186. The lower seal member 185 is slidably received within a tube 181 of the second upper telescoping member 162 (therefore, the lower seal member may also be called a "piston" 185). A fluid chamber 184 is defined between the upper seal member 182 and a lower seal 183 on the lower end of the upper telescoping member 162. The fluid chamber 184 contains a fluid, such as oil, therein, that is used in conjunction with the lower seal member 185 to act as a damper. The lower seal member 185 has plural holes 187 that extend therethrough and allow fluid in the fluid chamber 184 to travel therethrough. Thus, the lower seal member 185 divides the fluid chamber 184 into an upper cavity 188 and a lower cavity 189, with the holes 187 of the lower seal member allowing fluid to travel from one cavity to the other depending on forces acting on the upper telescoping member 162 and the lower portion 170. Due to the small volume of fluid that can travel through the holes 187, the movement of the lower seal member 185 along the tube 181 and within the fluid chamber 184 provides a dampening effect to forces acting on the second upper telescoping member 162 and the second lower telescopic tube 170.

Due to the movement of the tube 186 into and out of the fluid chamber 184 as the air spring 140 (and thus correspondingly the dampening unit) contracts and expands, the pressure within the fluid chamber 184 will tend to increase and decrease, respectively, and the overall pressure within the second shock absorber 160 unit will increase and decrease, respectively.

Referring now to FIGS. 4A, 7A, and 7B, the damper adjustment unit 190 includes several components that allow fluid from the fluid chamber 184 to flow into and out of a reservoir chamber 166 that is provided above the upper seal member 182. For example, a tube 192 is provided that extends downward through an opening in the upper seal member 182, one or more holes 193 are provided in the upper seal member 182, and one or more one-way valves (e.g., back-flow flap that is preferably spring-biased) for the holes 193 are provided on the lower surface of the upper seal member 182 to allow flow into, but not from the fluid chamber 184. One or more upper openings 196 are provided, for example, at an upper end of the tube 192, and one or more one-way valves for the upper openings 196 are provided to allow upward flow from the fluid chamber 184 and into the reservoir chamber 166 through the openings 196, but not downward flow from the openings 196 to the fluid chamber 184 through the tube 192. The damper adjustment unit 190 has a valve 200 as an actuator that can close or open the upper openings 196 for controlling the flow to the reservoir cavity 166. The circulation of the fluid between the fluid chamber 184 and the reservoir chamber 166 via the tube 192 equalizes pressure differentials with the second shock absorber 160, as the fluid chamber 184 expands and contracts when the valve 200 is opened. When the valve 200 is closed 196 and thus prevents the flow, the damper adjustment unit 190 provides a lockout feature of the second shock absorber 160.

The damper adjustment unit 190 is provided with a second electric motor unit 302 and the second transmission unit 308 at an upper end of the second shock absorber unit 160. The second electric motor unit 302 is preferably secured by a motor housing or bracket 314 to a sleeve 164a (part of a connecting bracket 164) that rigidly holds a periphery of an upper end of the upper telescopic tube 162. As noted above, the damper adjustment unit 190 is connected to the valve 200, which is configured to axially move as the valve 200 is rotated by the electric motor 302 (as will be described in detail with respect to FIGS. 7A and 7B). The second transmission unit 308 includes a pulley 315 provided at a drive axis of the second electric motor 302, a pulley 316 provided at a driven axis of the valve 200, and a timing belt 317 operatively connecting the two pulleys for providing a torque transmission from the second electric motor unit 302 to the damper adjustment unit 190 with a precise controlled timing.

FIGS. 5A and 5B are enlarged, partial front cross-sectional views of the stroke adjustment unit 150, in accordance with one exemplary embodiment. FIG. 5A shows the stroke adjustment unit in a long-to-short stroke position, while FIG. 5B shows the stroke adjustment unit in a short-to-long stroke position.

The shaft 152 that extends downwardly therefrom is rotatably mounted within a bearing member 220; however, the shaft 152 is generally prevented from moving axially (i.e., upward or downward, as depicted). The shaft includes a top portion 155 that is rigidly fixed to a center of a pulley 312, a middle portion 153 and a lower portion 154, which has a recessed portion 156 on an outer surface thereof. As noted above, the pulley 312 is configured to be rotated by the first electric motor unit 301 via a timing belt 313.

A flow control structure 222 is connected to a lower end of the bearing member 220, and the shaft 152 is rotatably provided within the flow control structure 222. The flow control structure 222 has a first flow control portion 230 and a second flow control portion 240 incorporated into a lower end thereof. The flow control structure 222 includes openings 224 above the first flow control portion 230, openings 225 (see FIG. 5A which shows the control structure 222 in a ninety degree axial offset as compared to the depiction in FIG. 5B) below the openings 225 and above the first flow control portion 230, openings 236 in between the first flow control portion 230 and the second flow control portion 240, and openings 226 below the second flow control portion 240. The first flow control portion 230 has openings 232 extending from an upper surface thereof to a lower surface thereof, and a one-way valve 234 on the upper surface thereof, which is preferably spring biased downward and prevents downward flow through the first flow control portion 230. The second flow control portion 240 has openings 242 (see FIG. 5A, since openings 232 and 242 are offset from one another about the axis of the control structure 222, and FIG. 5A shows the control structure 222 in a ninety degree axial offset as compared to the depiction in FIG. 5B) extending from an upper surface thereof to a lower surface thereof, and a one-way valve 244 on the lower surface thereof, which is preferably spring biased upward and prevents upward flow through the second flow control portion 240. The shaft 152 and the flow control structure 222 generally do not slide axially with respect to one another.

The first and second flow control portions 230 and 240 are slidably provided within a cylinder 251 of a sealed chamber 250. An upper end of the cylinder 251 is sealed by an upper seal 252 and a lower end of the cylinder 251 is sealed by the upper seal member 142 to form the sealed chamber 250. The chamber 250 is filled with fluid, which can be the same as or different from the fluid which is provided in the dampening unit 180 of the second shock absorber unit 160. In this embodiment, since the flow control structure 222 is generally not moveable in the axial direction thereof, the chamber 250 is axially slidable over the first and second flow control portions 230 and 240, but this axial sliding is controlled by the relative axial angular positions of the first and second flow control portions 230 and 240 with respect to the shaft 152. The relative axial angular positions between the first and second flow control portions 230 and 240 and the shaft 152 being determined by the angular rotation of the shaft 152 about its axis as the pulley 612 is rotated by the first electric motor unit 301. As illustrated in FIG. 5B, the axial sliding of the chamber 250 is determined by fluid being pooled either in a cavity 250a within the chamber 250 defined by the upper surface of the first flow control portion 230 and the upper seal 252, or in a cavity 250b within the chamber 250 defined by the lower surface of the second flow control portion 240 and the upper seal member 142. The pressure differentials caused by the pooling fluid causes the chamber 250 to move downward or upward, which simultaneously causes fluid to be injected into or extracted from the cavity 210 having a constant volume therein with a closed end. The pressure within the cavity 210 is monitored by a sensor 211 to monitor overpressurization within the cavity 210. The chamber 250 is biased downward toward the long stroke position by a compression spring (or pressing member or biasing member) 260.

Thus, when the first electric motor unit 301 is operated for the long-to-short stroke position (i.e., switching from the long stroke position as shown in FIG. 5A to the short stroke position as shown in FIG. 5B) and an outside force (e.g., the weight of the user on the bicycle frame) acts to compress or shorten the length of the first shock absorber unit 120, then the fluid present within chamber 250 will flow through the stroke adjustment unit 150 as shown by the arrows in FIG. 5A, causing a fluid pressure in cavity 210 with a closed-end. In the long-to-short stroke position, the recessed portion 156 will axially angularly align with openings 226 (which is not the case when in the short stroke position as in FIG. 5B) to allow the fluid in the chamber 250 to flow into the recessed portion 156, upward along the recessed portion 156 to the openings 236 (thus bypassing the one-way valves 244), through openings 232 and one-way valve 234, through opening 224, then upward through a gap between the outer surface of the middle portion 153 of the shaft 152 and the inner surface of the upper tubular portion of the flow control structure 222, and then upward through gaps between the upper portion of the shaft 152 and the bearing member 220, and pool in the cavity 210. The continuous upward flow and the resulting fluid pressure within the closed-end cavity 210 cause the cavity 250a to expand until an upper surface of the chamber 250 hits a lower surface of the bearing member 220.

In this manner, the stroke of the first shock absorber unit 120 will shorten due to the upward movement of the chamber 250, and in unison the stroke length of the second shock absorber unit 160 will shorten due to the connection to the first shock absorber unit 120 via bracket 104 and bracket 106. As noted previously, since the amount of air within the air chamber 146 will remain relatively constant during use (absent adjustment using the valve/nozzle 148, of course), the relative positions between the upper seal member 142 and the lower seal member 144 will remain relatively constant when outside forces on the front suspension 14 are disregarded. Thus, the upward adjustment of the longitudinal position of the upper seal member 142 along the upper telescoping member 122 will have the effect of upwardly adjusting the longitudinal position of the lower seal member 144, which will shorten the maximum total stroke length of the first and second shock absorber units 120 and 160.

Note that when the first electric motor unit 301 is operated for the long-to-short stroke position, a force that is acting to expand or lengthen the length of the first shock absorber unit 120 will not be able to lengthen the stroke, since the one-way valve 234 will prevent the fluid from traveling downward through the openings 232.

When the first electric motor unit 301 is operated in the short-to-long stroke position (i.e., switching from the short stroke position as shown in FIG. 5B to the long stroke position as shown in FIG. 5A), the shaft 152 of the stroke adjustment unit 150 is rotated, e.g., by ninety degrees in the present embodiment, or some other alternative predetermined amount in an alternative embodiment (note that for ease in illustration of the fluid flow, FIG. 5A shows the shaft 152 in the same axial angular position as in FIG. 5B, and instead shows the flow control structure 222 in an axially rotated orientation) and the outside force is removed or reversed to elongate the unit 120, then the reversed force and/or the spring 260 acts to expand or lengthen the length of the first shock absorber unit 120, and then the fluid within the stroke adjustment unit 150 will flow in the manner depicted by the arrows in FIG. 5B. Thus, fluid present within the cavity 210 will flow out and flow downward through gaps between the upper portion of the shaft 152 and the bearing member 220, downward through the gap between the outer surface of the middle portion 153 of the shaft 152 and the inner surface of the upper tubular portion of the flow control structure 222, through openings 224, through openings 225 (which is aligned with the recessed portion 156 when in the short-to-long stroke position), downward along the recessed portion 156 and into openings 236 (thus bypassing the one-way valve 234), downward through openings 242 and one-way valves 244, and into the cavity in the chamber 250 below the second flow control portion 240. The fluid pools in the cavity 250b below the second flow control portion 240 and allows the chamber 250 to move downward until the cavity 250a is substantially closed.

In this manner, the stroke of the first shock absorber unit 120 will lengthen due to the downward movement of the chamber 250, and in unison the stroke length of the second shock absorber unit 160 will lengthen due to the connection to the first shock absorber unit 120 via bracket 104 and bracket 106. As noted previously, since the amount of air within the air chamber 146 will remain relatively constant during use (absent adjustment using the valve/nozzle 148, of course), the relative positions between the upper seal member 142 and the lower seal member 144 will remain relatively constant when outside forces on the front suspension 14 are disregarded. Thus, the downward adjustment of the longitudinal position of the upper seal member 142 along the upper telescoping member 122 will have the effect of downwardly adjusting the longitudinal position of the lower seal member 144, which will lengthen the maximum total stroke length of the first and second shock absorber units 120 and 160.

Note that when the first electric motor unit 301 is operated in the short-to-long stroke position, a force that is acting to compress or shorten the length of the first shock absorber unit 120 will not be able to shorten the stroke, since the one-way valve 244 will prevent the fluid from traveling upward through the openings 242.

FIG. 6A is an enlarged, partial front cross-sectional view of another embodiment of a stroke adjustment unit 750a of a shock absorber unit, FIG. 6B is a top schematic view of a transmission unit of the stroke adjustment unit 750a of FIG. 6A, FIG. 6C is an enlarged, partial front cross-sectional view of a further embodiment of a stroke adjustment unit 750b of a shock absorber unit, and FIG. 6D is a top schematic view of a transmission unit of the stroke adjustment unit 750b of FIG. 6C.

Referring to FIGS. 6A and 6B, the stroke adjustment unit 750a includes a shaft 753 having a helically threaded or grooved surface 753e on an outer circumference thereof, which is provided as an actuator for adjusting a stroke of the first shock absorber unit 120. Basically, the stroke adjustment unit 750a includes the shaft 753, an upper cylinder 751 having an upper portion that is rigidly connected to an upper end of the upper telescopic tube 122, and a lower cylinder 752 having an upper portion that is slidably received within a lower portion of the upper cylinder 751. The shaft 753 is rotatably received by an upper portion of the upper cylinder 751. The shaft 753 has an upper end 753a that is rigidly connected to an axial bore of a driven gear 523. The shaft 753 has flanges 753c and 753d that are positioned adjacent to an upper surface and a lower surface, respectively, of the upper cylinder 751 such that the shaft 753 cannot axially move, but can rotate about an axis thereof. A lower end 753b of the shaft 753 is provided within the lower portion of the upper cylinder 751. The upper portion of the lower cylinder 752 has ball members 755 that mesh with the threaded surface 753e of the shaft 753 and holds the lower cylinder 752 within an interior of the upper cylinder 751. Seals or gaskets 754 (e.g., O-rings, etc.) are provided on an outer circumference of the upper portion of the lower cylinder 752 in order to seal the interface between the lower cylinder 752 and the upper cylinder 751.

The first electric motor unit 501 is provided with a first transmission unit 507 that includes a drive gear 520 provided at a drive axis of the motor, a mid gear 521, and the driven gear 523 provided at the driven axis of the shaft 753. When the shaft 753 is rotated by a torque transmitted from the first electric motor unit 501, the threaded surface 753e guides the ball members 755 so that the lower cylinder 752 relatively moves upward or downward within the upper cylinder 751 as guided by the seals 754.

Referring to FIGS. 6C and 6D, the stroke adjustment unit 750b includes a different transmission unit that includes pulleys 524 and 525, and a timing belt 526 provided to connect the two pulleys.

A configuration relying on a mechanical adjustment such as by using the threaded surface 753e of the shaft 753 in the embodiments depicted in FIGS. 6A-6D, provides a fine control of the adjustment setting of a stroke length, since an adjusted length of the stroke and its adjustable range is precisely determined by a rotational amount or angle of the actuator which is electronically controllable. For example, a diameter of the actuator shaft and a pitch of the thread thereon, and a transmission ratio are selected for providing a desired adjustment setting, e.g., a desired maximum and minimum length with a desired adjustability of the length between the maximum and minimum length.

FIGS. 7A and 7B provide enlarged, partial cross-sectional views of the damper adjustment unit 190 of the second shock absorber unit 160. FIGS. 7A and 7B depict the damper adjustment unit 190, respectively, unlocked and locked.

The valve 200 of the damper adjustment unit 190 is slidably received within the interior of the tube 192. When the valve 200 is moved to the lowest position, then a lower end 204 of the valve 200 seats against and seals with a seat 198 on a lower end of the tube 192 as shown in FIG. 7B, which is providing a lockout position of the damper adjustment unit 190 by increasing a damper force. When the valve 200 is at any position along the tube 192 except at the lowest position, and pressure within the fluid chamber 184 increases due to upward movement of the tube 186 or downward movement of the valve 200, then fluid from the fluid chamber 184 can flow up the tube 192 (around the outer surface of the valve 200 if necessary) and through the opening(s) 196 and one way valve(s) 197 into the reservoir chamber 166, which is otherwise empty of fluid or partially filled with fluid. Conversely, when the valve 200 is at any position along the tube 192 except at the lowest position, and pressure within the fluid chamber 184 decreases due to downward movement of the tube 186 or upward movement of the valve 200, then fluid from the reservoir chamber 166 can flow down through the hole(s) 193 and one-way valve(s) 194 into the fluid chamber 184. When the valve 200 is at the lowest position as shown in FIG. 7B, then the contact between the lower end 204 of the valve 200 and seat 198 will prevent fluid from being sent from the fluid chamber 184 into the reservoir chamber 166 (note also that the one-way valve(s) 194 prevents fluid from flowing through the hole(s) 193 into the reservoir chamber 166), which will act as a suspension lockout feature and prevent or substantially prevent the contraction or expansion of the first shock absorber unit 120 and the second shock absorber unit 160, since the tube 186 will be restricted from sliding and thus unit 160 from expanding or contracting due to the inability to equalize pressure within the unit 160, which will prevent or substantially prevent expansion or contraction of unit 120 via bracket 106. The suspension lockout feature can be unlocked to allow expansion and contraction of the first and second shock absorber units 120 and 160 by moving the valve 200 upward, as shown in FIG. 7A.

In addition, the damper adjustment unit 190 is configured to adjust the damping force applied by the damper 180 within the second shock absorber unit 160. As the valve 200 is controlled to move downward from the upper position shown in FIG. 7A to the lower position in FIG. 7B, the damper adjustment unit 190 will continuously increase the damping force of the dampening unit 180. The converse is also true as the valve 200 moves upward. The movement of the valve 200 from the upper position shown in FIG. 7A to the lower position in FIG. 7B will continuously increase the overall pressure within the second shock absorber 160, or more specifically within the upper telescoping member 162, which will continuously increase the dampening force applied by the dampening unit 180. Also, the upward movement of the tube 186 into the second upper telescoping member 162 during shortening of the stroke length will also continuously increase the overall pressure within the second upper telescoping member 162. Additionally, as the valve 200 moves downward during shortening of the stroke length, the valve 200 will act as a barrier to fluid traveling upward through tube 192 in an attempt to equalize pressure between the fluid chamber 184 and the reservoir chamber 166, which will also effect the pressure within the fluid chamber 184, which will also have an effect on the dampening force applied by the dampening unit 180.

FIG. 8A is an enlarged, partial front cross-sectional views of another embodiment of a damper adjustment unit 890a of a shock absorber unit, FIG. 8B is a top schematic view of a transmission unit of the damper adjustment unit 890a of FIG. 8A, FIG. 8C is an enlarged, partial front cross-sectional view of a further embodiment of a damper adjustment unit 890b of a shock absorber unit, and FIG. 8D is a top schematic view of a transmission unit of the damper adjustment unit 890b of FIG. 8C.

Basically, the damper adjustment unit 890a, as shown in FIGS. 8A and 8B, includes a lockout actuator unit 800, a center shaft 801, and a tube 892 that is rigidly mounted within the upper telescopic tube 162 via seal members 882 and 883 such that the tube 892 and the center shaft 801 do not slide within the second upper telescopic tube 162 along the longitudinal direction. The lockout actuator unit 800 includes a cap 802 rigidly connected to the top of the center shaft 801, a middle portion 805 having a seat member 806, a driven pulley 804 provided between the cap 802 and the seat member 806, a cylinder valve 808 that is rigidly received within an axial bore of the driven pulley 804, and a lower portion 807 rigidly received within the upper telescopic tube 162. The cylinder valve 808 rotatably and slidably receives the center shaft 801 therein. The cylinder valve 808 has a valve member 808a facing a top of the tube 892 and an outer surface 808b adjacent an inner surface 807b of the lower portion 807. The outer surface 808b of the cylinder valve 808 is threaded with the inner surface 807b of the lower portion 807 such that the cylinder valve 808 and the driven pulley 804 relatively moves upward or downward along the center shaft 801 as the driven pulley 804 is rotated by the second electric motor unit 302 using a driving pulley 810 via a timing belt 809. The axial movement of the cylinder valve 808 and the driven pulley 804 is defined and limited between a lower surface of the cap 802 and an upper surface of the seat member 806.

When the cylinder valve 808 is at the upward position as shown in FIG. 8A and the fluid chamber 184 contracts, the fluid is allowed to flow from the fluid chamber 184 into a gap between the center shaft 801 and the tube 892, upward along the gap, then through a gap between the top of the tube 892 and the valve member 808a, and into the reservoir chamber 166 through an opening 896, as shown by the arrows in FIG. 8A.

When the cylinder valve 808 is at the lowest position (not shown) and prevent the fluid from being sent from the fluid chamber 184 into the gap between the center shaft 801 and the tube 892, which will act as a suspension lockout feature and prevent or substantially prevent the contraction or expansion of the first shock absorber unit 120 and the second shock absorber unit 160, as described above with reference to FIGS. 7A and 7B.

As seen in FIGS. 8C and 8D, instead of pulleys 802 and 810 and a timing belt 809 shown in FIGS. 8A and 8B, a gear transmission unit 811 including plural gear wheels can be used for the torque transmission from the second electric motor unit 320 to the lockout actuator unit 800.

As previously described, the switch unit 304 has the long-to-short stroke position and the long-to-short stroke position. In the long-to-short stroke position, the shock absorber units 120 and 160 are able to move from the long stroke position (or any position at which the stroke is longer than at the short stroke position) toward the short stroke position, and are prevented from moving from the short stroke position (or any position at which the stroke is shorter than at the long stroke position) toward the long stroke position. Conversely, in the short-to-long stroke position, the shock absorber units 120 and 160 are able to move from the short stroke position (or any position at which the stroke is shorter than at the long stroke position) toward the long stroke position, and are prevented from moving from the long stroke position (or any position at which the stroke is longer than at the short stroke position) toward the short stroke position. Thus, the electronic control system of the front suspension provides electronic control of the adjustment of the shock absorber units to allow shortening of the stroke or lengthening of the stroke as the user operates the switch unit.

It should be noted that while the stroke adjustment unit is used to adjust the stroke of the suspension, such an adjustment may or may not provide an adjustment of dampening characteristics or spring-rate of the shock absorber units. The various spring and dampening characteristics of the shock absorber units will continue to function regardless of the position of the switch unit, unless and until the first and second shock absorber units 120 and 160 reaches the short stroke position. In one embodiment, when the second shock absorber unit 160 is in the lockout position and the switch unit is in the long-to-short stroke position, the lockout position prevents or substantially prevents the contraction or expansion of the first shock absorber unit 120 and the second shock absorber unit 160 thus adjusting dampening of the suspension, until the switch unit is switched to the short-to-long stroke position, then the suspension lockout feature is unlocked.

The stroke adjustment unit also provides a stroke adjustment locking feature. For example, when the switch unit is in the long-to-short stroke position and the shock absorber units reach the shortest stroke limit, then the stroke length of the first and second shock absorber units 120 and 160 are fixed until the switch unit is switched to the short-to-long stroke position. Similarly, when the switch unit is in the short-to-long stroke position and the shock absorber units reach the longest stroke limit, then the stroke length of the first and second shock absorber units 120 and 160 are fixed until the switch unit is switched to the long-to-short stroke position.

Thus, the switch unit allows a user to set it in the long-to-short stroke position to shorten the front suspension (while preventing lengthening of the stroke), for example, as the user ascends up an incline thereby reducing an angle of the bicycle frame with respect to horizontal, and then set it to the short-to-long stroke position to lengthen the stroke when the user reaches a level area. By reducing the angle of the bicycle frame with respect to horizontal, the user can achieve a more advantageous orientation of the bicycle as the user pedals up an incline. Similarly, in a configuration where the electronic control system and shock absorber units are provided on the rear suspension of the bicycle, the user can set the switch unit in the long-to-short stroke position to shorten the rear suspension (while preventing lengthening of the stroke), for example, as the user descends down a hill thereby reducing an angle of the bicycle frame with respect to horizontal to provide a better orientation of the user as the user descends. Furthermore, in a configuration where an electronic control system and corresponding shock absorber units are provided on both the front suspension and the rear suspension of the bicycle, these units can also be used in conjunctions with one another to provide an even greater range of adjustment of the angle of the bicycle frame to horizontal.

Figure 9:
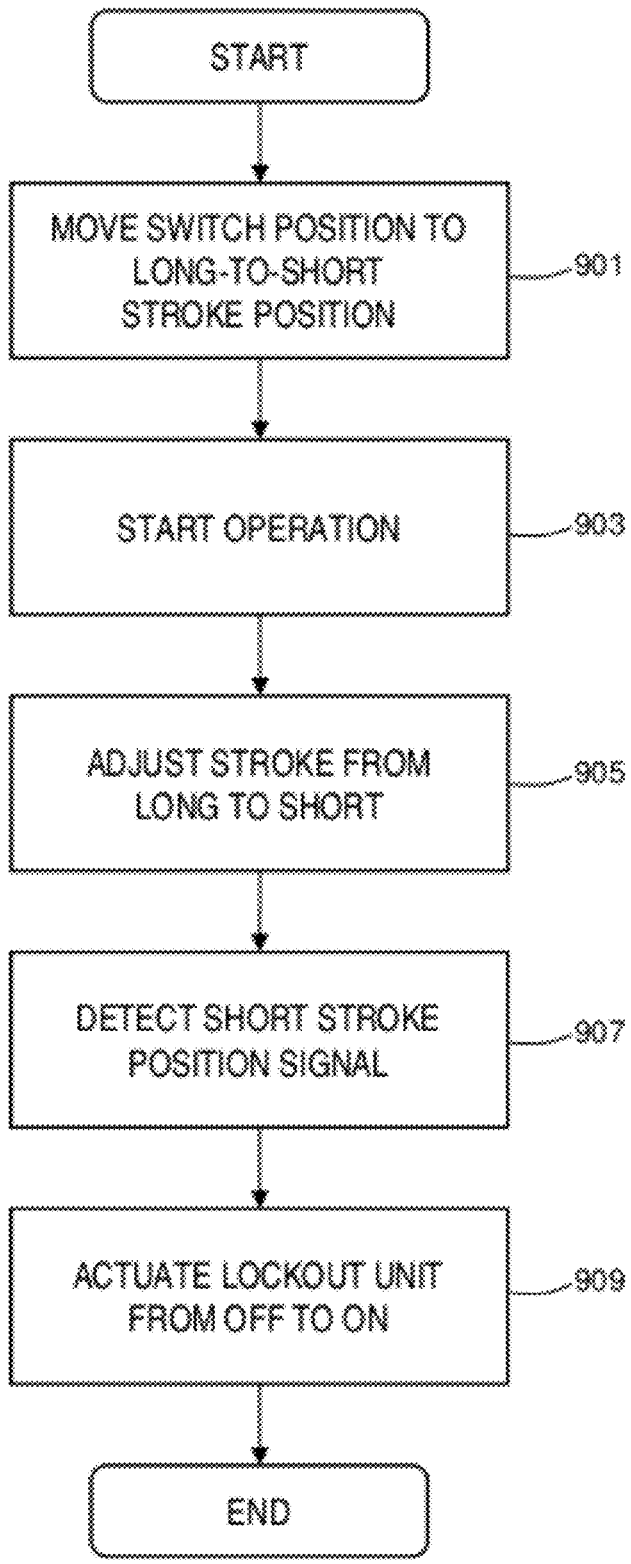
FIG. 9 is a flow diagram showing electronic control of a front suspension operating in a long-to-short stroke position (i.e., in a first state), in accordance with an exemplary embodiment.
Figure 10:
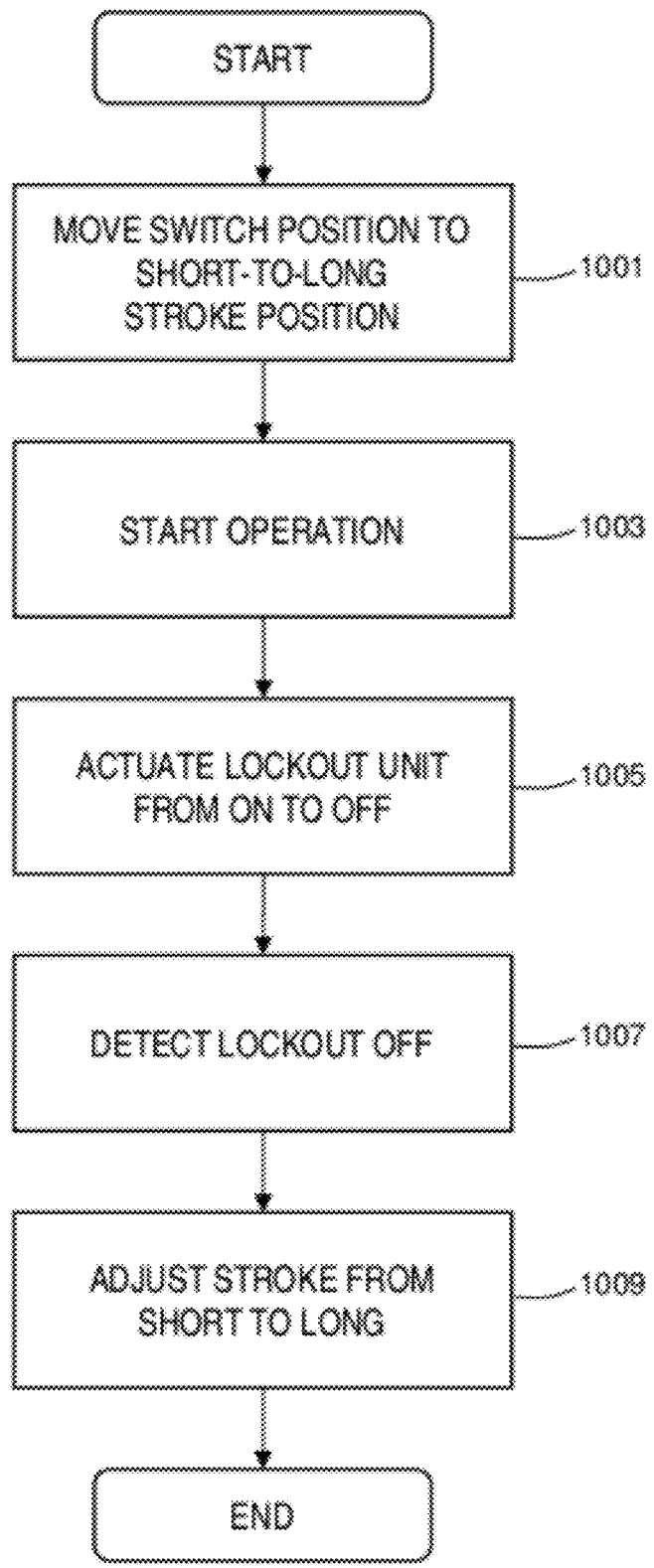
FIG. 10 is a flow diagram showing electronic control of a front suspension operating in a short-to-long stroke position (i.e., in a second state), in accordance with an exemplary embodiment.

FIGS. 9 and 10 will be used to describe a control method of the front suspension in accordance with an exemplary embodiment, in which the front suspension is controlled to switch between two states as shown in Table 1.

TABLE 1

| | Stroke | Lockout | Slope | Switch position |
| --- | --- | --- | --- | --- |
| First state | 140 mm → 100 mm | Off → On | Ascent or Flat | Down → Up |
| Second state | 100 mm → 140 mm | On → Off | Descent or Flat | Up → Down |

As can be seen in FIG. 9, when the switch is moved to a long-to-short stroke position in step 901, a long-to-short stroke operation is started in step 903 for reducing an angle of the bicycle frame with respect to horizontal. In this first state, the stroke adjustment unit is actuated to shorten the stroke in step 905, and after a targeted short stroke position is detected in step 907, then the damper adjustment unit is actuated to lockout the front suspension in step 909. It should be noted that this first state operation normally starts from a condition in which the front suspension has a long stroke and unlocked position. The stroke adjustment to the short stroke position should preferably be performed before the lockout is performed.

As can be seen in FIG. 10, when the switch is moved to a short-to-long stroke position in step 1001, then a short-to-long stroke operation is started in step 1003 for increasing an angle of the bicycle frame with respect to horizontal. In this second state, the damper adjustment unit is actuated to unlock the front suspension in step 1005, and after completion of unlocking the front suspension is detected in step 1007, then the stroke adjustment unit is actuated to lengthen the stroke inn step 1009. It should be noted that the second state operation normally starts from the condition in which the front suspension has a short stroke and locked position. Accordingly, the front suspension should preferably be unlocked before the stroke is adjusted.

Figure 11:
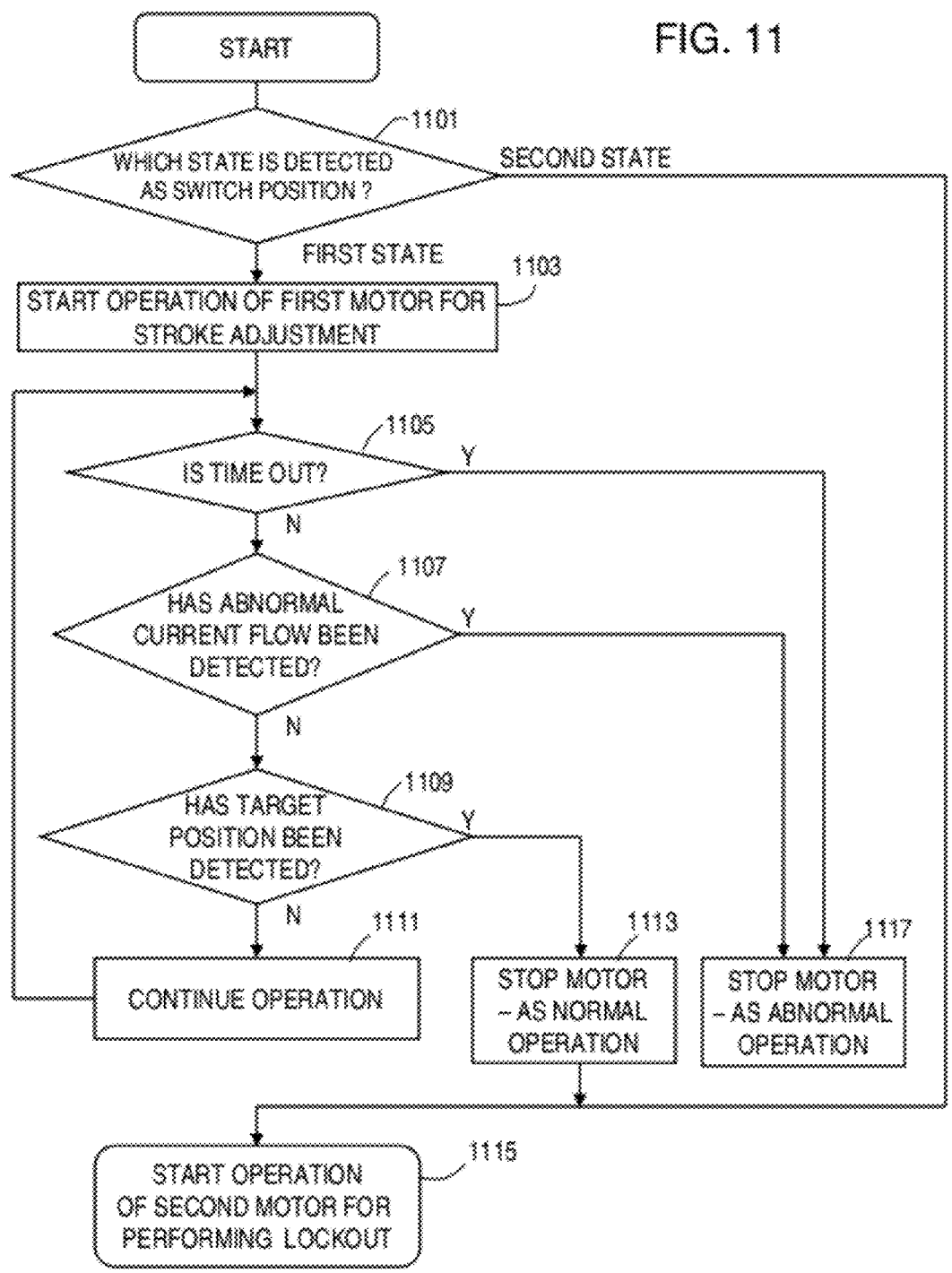
FIG. 11 is a flow diagram showing control of two electric motors for performing the exemplary method shown in FIGS. 9 and 10.

FIG. 11 shows a flow diagram for controlling two electric motors to perform the control method as shown in FIGS. 9 and 10. Switching between the two settings such as in Table 1 requires alternate and consecutive operations of two electric motors (e.g., the first and second electric motors 301 and 302). In addition, the order of operations between the two motors should preferably be selected according to a position signal from the switch unit. FIG. 11 shows an example of such control flow with error detection functions.

In step 1101, a switch position (e.g., position of adjustment lever 304a), as selected by a user, is detected and determined between "first state" and "second state." If the switch position is determined to be "first state," then the process proceeds to step 1103 for performing a stroke adjustment. For example, the first electric motor 301 is actuated and operated until a target position such as of the shortened stroke length with 100 mm is achieved. Once the first motor is started in step 1103, then in step 1105 a timer can be started that determines whether a predetermined time period has expired (or timed out), which would indicate a problem exists if the timer times out prior to the short stroke being reached. Also, in step 1107, a detector can be queried as to whether an abnormal current flow to the motor has been detected that would also indicate that a problem exists. If any error or abnormal current flow is detected in step 1105 or step 1107, then the process will be stopped as an abnormal operation in step 1117, which provides a secured operation of the actuating motor and actuated units and prevents possible further damage thereto.

If steps 1105 and 1107 do not detect errors or abnormal operation, and the target position is detected in step 1109, the first electric motor is stopped in a normal manner in step 1113. However, if the target position has not yet been reached, then the motor will continue operation in step 1111 and loop back to step 1105. If the target position has been reached in step 1109 and the first motor stopped in step 1113, then the second electric motor is in turn operated proceeding to step 1115 for performing lockout of the damper unit. Further process for the second electric motor operation (not shown) may include substantially the same steps as illustrated for the first electric motor in FIG. 11; however, the second electric motor will be stopped on detecting a lockout position of the damper unit and the whole operation for the first state will end and maintain the state until another position signal is detected in step 1101. If the "second state" is detected in step 1101, the process proceeds to an operation of the second electric motor to unlock the damper unit, then the first electric motor will be operated to lengthen the stroke through steps corresponding to steps 1103, etc. In this manner, the respective actuating direction of the motors (i.e., rotational directions) will be reversed between the first state and the second state. For example, the first electric motor is operated to shorten the stroke in the first state, while the first electric motor is operated to lengthen the stroke in the second state.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein. The term "comprising" and its derivatives, as used herein, are intended to be open ended terms that specify the presence of the stated features, elements, components, groups, integers, and/or steps, but do not exclude the presence of other, unstated features, elements, components, groups, integers, and/or steps. This definition also applies to words of similar meaning, for example, the terms "having" and "including" and their derivatives.

What is claimed is:

1. A bicycle suspension comprising:
   a stroke adjustment unit configured to adjust a stroke of the bicycle suspension, which is configured to expand and contract within the stroke;
   a suspension damper configured to apply damping force to the bicycle suspension;
   a damper adjustment unit configured to adjust the damping force applied by the suspension damper; and
   an electronic controller configured to control the stroke adjustment unit and the damper adjustment unit,
   wherein the controller is configured to have a first state in which the damper adjustment unit is controlled to lock the damping force and in which the stroke adjustment unit is controlled to provide a shortened stroke length, and the controller is configured to have a second state in which the damper adjustment unit is controlled to unlock the damping force and in which the stroke adjustment unit is controlled to provide a lengthened stroke length.

2. The bicycle suspension according to claim 1,
   wherein, in the first state, the stroke adjustment to the short stroke position is performed before the lockout is performed, and
   wherein, in the second state, the bicycle suspension is unlocked before the stroke adjustment to the long stroke position is performed.

3. A bicycle suspension comprising:
   a stroke adjustment unit configured to adjust a stroke of the bicycle suspension, which is configured to expand and contract within the stroke;
   a suspension damper configured to apply damping force to the bicycle suspension;
   a damper adjustment unit configured to adjust the damping force applied by the suspension damper;
   an electronic controller configured to control the stroke adjustment unit and the damper adjustment unit;
   a first motor driven actuator configured to actuate the stroke adjustment unit to allow the stroke to be shortened or lengthened; and
   a second motor driven actuator configured to actuate the damper adjustment unit to allow the damping force to be increased or decreased.

4. The bicycle suspension according to claim 1, further comprising:
   a switch configured to allow the controller to switch between the first state and the second state.

5. The bicycle suspension according to claim 1, further comprising:
   a first telescopic tube including the stroke adjustment unit and a biasing member configured to expand the first telescopic tube;
   a second telescopic tube including the suspension damper and the damper adjustment unit; and
   a connector connecting the first telescopic tube and the second telescopic tube so that the second telescopic tube expands and contracts as the first telescopic tube expands and contracts.

6. A method for controlling a bicycle suspension, the method comprising:
   providing a stroke adjustment unit to adjust a stroke of the bicycle suspension, which is configured to expand and contract within the stroke;
   providing a damper adjustment unit configured to adjust a damping force applied by a suspension damper to the bicycle; and
   electronically controlling the stroke adjustment unit to adjust the stroke and the damper adjustment unit to adjust the damping force,
   wherein the electronic control of the stroke adjustment unit and the damper adjustment unit includes:
      switching to a first state in which the damper adjustment unit is controlled to lock the damping force and in which the stroke adjustment unit is controlled to provide a shortened stroke length; and
      switching to a second state in which the damper adjustment unit is controlled to unlock the damping force and in which the stroke adjustment unit is controlled to provide a lengthened stroke length.

7. A bicycle suspension comprising:
   means for adjusting a stroke of the bicycle suspension, which is configured to expand and contract within the stroke;
   means for applying damping force to the bicycle suspension;
   means for adjusting the damping force; and
   means for electronically controlling the means for adjusting the stroke and the means for adjusting the damping force,
   wherein the means for electronically controlling has a first state in which the means for adjusting the damping force is controlled to lock the damping force and in which the means for adjusting the stroke is controlled to provide a shortened stroke length, and the means for electronically controlling is configured to have a second state in which the means for adjusting the damping force is controlled to unlock the damping force and in which the means for adjusting the stroke is controlled to provide a lengthened stroke length.

8. A method for controlling a bicycle suspension, the method comprising:
providing a stroke adjustment unit to adjust a stroke of the bicycle suspension, which is configured to expand and contract within the stroke;
providing a damper adjustment unit configured to adjust a damping force applied by a suspension damper to the bicycle;
electronically controlling the stroke adjustment unit to adjust the stroke and the damper adjustment unit to adjust the damping force;
providing a first motor driven actuator configured to actuate the stroke adjustment unit to allow the stroke to be shortened or lengthened; and
providing a second motor driven actuator configured to actuate the damper adjustment unit to allow the damping force to be increased or decreased.

9. A bicycle suspension comprising:
means for adjusting a stroke of the bicycle suspension, which is configured to expand and contract within the stroke;
means for applying damping force to the bicycle suspension;
means for adjusting the damping force;
means for electronically controlling the means for adjusting the stroke and the means for adjusting the damping force;
a first motor driven actuator configured to actuate the stroke adjustment unit to allow the stroke to be shortened or lengthened; and
a second motor driven actuator configured to actuate the damper adjustment unit to allow the damping force to be increased or decreased.

* * * * *